US008427010B2

(12) United States Patent
Bose et al.

(10) Patent No.: US 8,427,010 B2
(45) Date of Patent: Apr. 23, 2013

(54) DC-TO-AC POWER CONVERSION SYSTEM AND METHOD

(75) Inventors: Sumit Bose, Niskayuna, NY (US); Ralph Teichmann, Niskayuna, NY (US); Kathleen Ann O'Brien, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 12/475,244

(22) Filed: May 29, 2009

(65) Prior Publication Data

US 2010/0141041 A1 Jun. 10, 2010

(51) Int. Cl.
*H02J 1/00* (2006.01)
*H02J 3/00* (2006.01)

(52) U.S. Cl.
USPC .................. 307/82; 361/20; 361/71; 323/282

(58) Field of Classification Search ........................ None
See application file for complete search history.

(56) References Cited

U.S. PATENT DOCUMENTS

| | | | | |
|---|---|---|---|---|
| 5,506,765 | A * | 4/1996 | Nakata et al. | 363/98 |
| 6,353,547 | B1 * | 3/2002 | Jang et al. | 363/132 |
| 6,611,441 | B2 * | 8/2003 | Kurokami et al. | 363/56.02 |
| 6,697,274 | B2 | 2/2004 | Bernet et al. | |
| 7,072,194 | B2 * | 7/2006 | Nayar et al. | 363/71 |
| 7,109,681 | B2 * | 9/2006 | Baker et al. | 318/801 |
| 7,168,251 | B1 | 1/2007 | Janssen | |
| 7,378,820 | B2 | 5/2008 | Liu et al. | |
| 7,465,872 | B1 | 12/2008 | de Rooij et al. | |
| 7,706,163 | B2 * | 4/2010 | Tan et al. | 363/132 |
| 2002/0195136 | A1 * | 12/2002 | Takabayashi et al. | 136/244 |
| 2005/0105314 | A1 * | 5/2005 | Nielsen | 363/132 |
| 2005/0225090 | A1 * | 10/2005 | Wobben | 290/44 |
| 2006/0108988 | A1 * | 5/2006 | McKelvey et al. | 323/205 |
| 2006/0114642 | A1 * | 6/2006 | Liu et al. | 361/500 |
| 2006/0227483 | A1 * | 10/2006 | Akagi | 361/118 |
| 2007/0019449 | A1 * | 1/2007 | Nagatsuka et al. | 363/98 |
| 2007/0153555 | A1 * | 7/2007 | Stulz et al. | 363/20 |
| 2007/0228836 | A1 * | 10/2007 | Teichmann | 307/80 |
| 2007/0273338 | A1 * | 11/2007 | West | 323/222 |
| 2008/0112200 | A1 | 5/2008 | Tan et al. | |

OTHER PUBLICATIONS

Salvador Alepuz; Interfacing Renewable Energy Sources to the Utility Grid Using a Three-Level Inverter; IEEE Transactions on Industrial Electronics, vol. 53, No. 5, Oct. 2006.
Martina Calais; Multilevel Converters for Single-Phase Grid Connected Photovoltaic Systems—An Overview; Center for Renewable Energy Systems Technology Australia; IEEE, 1998.
Roberto Gonzalez; Transformerless Single-Phase Multilevel-Based Photovoltaic Inverter; IEEE Transactions on Industrial Electronics, vol. 55. No. 7, Jul. 2008.
T. Kerekes; Evaluation of Three-Phase Transformerless Photovoltaic Inverter Topologies, downloaded on Feb. 3, 2009.

(Continued)

*Primary Examiner* — Jared Fureman
*Assistant Examiner* — Alfonso Perez Borroto
(74) *Attorney, Agent, or Firm* — Fletcher Yoder P.C.

(57) ABSTRACT

A system, in one embodiment, includes a photovoltaic power converter. The photovoltaic power converter includes one or more photovoltaic arrays configured convert solar energy into a DC signal and two or more N-level converters coupled to a common DC bus (N being an integer greater than 2).

20 Claims, 10 Drawing Sheets

ENERGY STORAGE / DISSIPATION DEVICE
132
14
N-LEVEL DC-DC CONVERTER
130
12
29
109
110
111
114
116
118
PV ARRAY
N-LEVEL DC-DC CONVERTER (N ≥ 3)
N-LEVEL DC-AC CONVERTER (N ≥ 3)
N-LEVEL DC-AC CONVERTER (N ≥ 3)
FILTER
AC POWER GRID
114
16
24
120
112
CONTROL LOGIC
122
122
26

OTHER PUBLICATIONS

Dong-Ho Lee; A Power Conditioning System for Superconductive Magnetic Energy Storage Based on Multi-Level Voltage Source Converter; Blackburg, Virginia, Jul. 6, 1999.

Oscar Lopez; Eliminating Ground Current in a Transformerless Photovoltaic Application; Electronics Technology Department, Vigo University; ES-36310 Vigo, Spain, 2007.

Eric Seymour; Design Characteristics of High-Power Photovoltaic Inverters; Advanced Energy Industries, Inc., 2008.

Ralph Teichmann; A Comparison of Three-Level Converters Versus Two-Level Converters for Low-Voltage Drives, Traction, and Utility Applications; vol. 41, No. 3, May/Jun. 2005.

Dr.-Ing. Bruno Burger; Hocheziente Wechselrichter zur Einspeisung regenerativer Energie; Seminar ECPE, ETG, FhG-IISB; Erlangen, den 13, Oct. 2005.

* cited by examiner

DC-TO-AC POWER CONVERSION SYSTEM AND METHOD

BACKGROUND OF THE INVENTION

The subject matter disclosed herein generally relates to power conversion systems and, more particularly, to photovoltaic power conversion systems.

The demand for attractive and practical alternative renewable energy sources for generating electrical energy has continued to steadily increase due at least in part to rising environmental concerns. For example, some power systems utilize photovoltaic arrays for processing solar energy (e.g., sunlight) into a standard and usable electrical form. Typically, system integration costs generally decrease as system voltages increase, particularly for larger-scale applications in the mega-watt range. Unfortunately, existing photovoltaic power converters are limited in output voltage and/or are relatively inefficient for use in higher voltage systems, thus negatively impacting overall system efficiency. As a result, existing photovoltaic power converters are not well suited for large scale photovoltaic arrays.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a photovoltaic power converter. The photovoltaic power converter includes one or more photovoltaic arrays configured convert solar energy into a DC signal and two or more N-level converters coupled to a common DC bus (N being an integer greater than 2).

In another embodiment, a system includes a photovoltaic power converter. The photovoltaic power converter includes two or more photovoltaic arrays coupled in series and configured to convert solar energy into a DC signal, wherein the two or more photovoltaic arrays comprise a first photovoltaic array and a second photovoltaic array. The photovoltaic power converter further includes a grounding point coupled between the first and second photovoltaic arrays and at least one N-level converter coupled downstream from the two or more photovoltaic arrays and configured to receive the DC signal on a DC bus (N being an integer greater than 2).

In a further embodiment, a system includes a photovoltaic power converter. The photovoltaic power converter includes at least one photovoltaic array configured convert solar energy into a DC signal, two or more N-level converters coupled to a common DC bus (N being an integer greater than 2), and a three-winding transformer coupled downstream from the two or more N-level converters.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
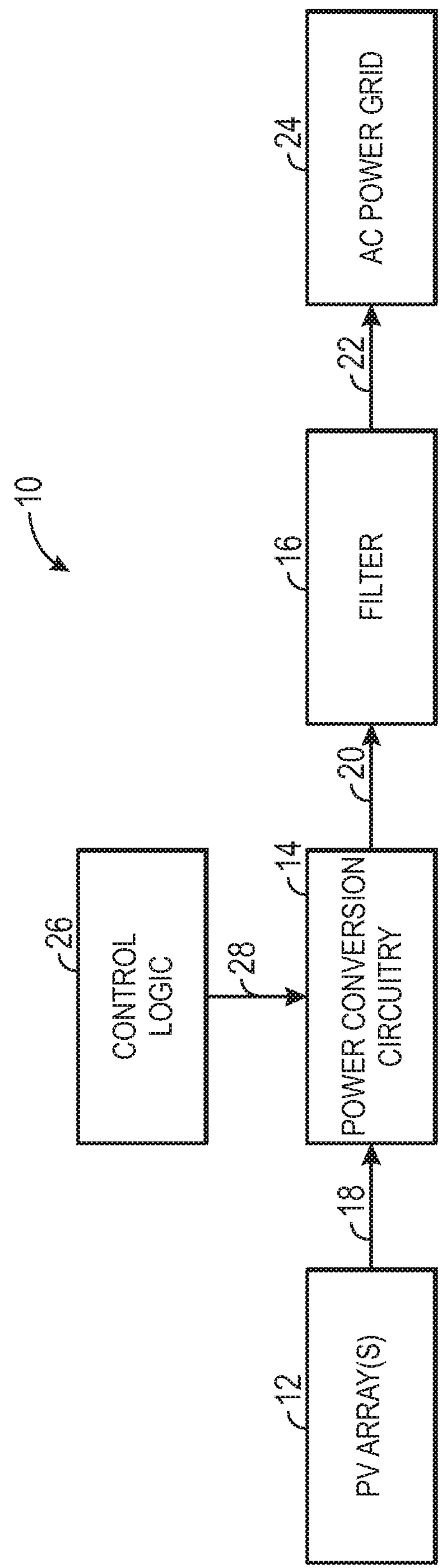
FIG. 1 is a simplified block diagram of a photovoltaic power system, in accordance with an embodiment of the present invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Further, any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

The present disclosure generally relates to photovoltaic power systems. In particular, various embodiments of the present invention provide for a photovoltaic power system utilizing multilevel converters having at least a three-level design, rather than a two-level converter design. In contrast with the discussed embodiments, photovoltaic power systems with a two-level DC-to-AC converter are configured to produce an AC output waveform using pulse width modulation (PWM) with only two voltage levels, which may result in a higher level of distortion in the AC output voltage and current unless corrective measures are taken. Additionally, two-level designs may also exhibit greater total harmonic distortion compared to multilevel converters utilizing designs of three-levels or higher. Further, multilevel converter designs generally exert lower voltage stress (compared to two-level designs) on windings of electromagnetic conversion equipment, such as transformers With the foregoing in mind, it should be understood that a multilevel converter having at least a three-level design or higher may be referred to in the present disclosure as an "N-level converter," wherein N is an integer greater than or equal to three. For instance, an "N-level converter" may be a converter having a three-level configuration, a four-level configuration, a five-level configuration, a six-level configuration, or more. Further, it should be understood that the terms "downstream" and "upstream," as used herein, generally refer to the direction of current flow within a circuit. That is, a downstream direction may refer to the direction of current flow, and an upstream direction may refer to a direction opposite the flow of current.

As will be discussed below, photovoltaic power systems, in accordance with embodiments of the present invention, generally include one or more photovoltaic sources configured to convert solar energy (e.g., sunlight) into DC power. Using an arrangement of one or more N-level converters, the DC power output of the photovoltaic source(s) may be converted into AC power, which may then be used to drive a load. In applications where the photovoltaic system is connected to a power grid, the AC power output from the N-level converters may be supplied to the power grid.

As will be appreciated, the use of N-level converters (having three or more levels) may offer several advantages compared to two-level designs. For example, N-level converters may have higher partial and full load efficiencies, especially at higher converter switching frequencies. Further, N-level converters generally provide for improved harmonic performance and reduced semiconductor switching losses. For instance, switching losses in a three-level converter design may be reduced by as much as 10 to 50 percent compared to a two-level converter. As such, N-level inverters use less cooling than two-level converter designs. These and other features, aspects, and advantages of the presently disclosed techniques will be discussed below with reference to FIGS. 1-7.

Referring first to FIG. 1, a block diagram of an embodiment of a photovoltaic power system 10 that may incorporate one or more aspects of the presently disclosed techniques is illustrated. The power system 10 may include one or more photovoltaic (PV) arrays 12, power conversion circuitry 14, and filtering circuitry 16. The photovoltaic arrays 12, which may also be referred to as solar arrays, may include any suitable type of photovoltaic power source. For example, the photovoltaic array(s) 12 may include one or more panels having a networked assembly of photovoltaic or "solar" cells. The solar cells are generally configured to convert solar energy into a DC electrical energy using the photovoltaic effect. A DC power output signal 18 from the photovoltaic array(s) 12 may be received by the power conversion circuitry 14. The power conversion circuitry 14 may be configured to convert the DC signal 18 into AC power, as indicated by reference number 20. By way of example, depending on the configuration of the power conversion circuitry 14, the DC power signal 18 may be converted into single-phase AC power or three-phase AC power.

As shown, the AC power output from the power conversion circuitry 14 may be supplied to an AC power grid 24. In the illustrated embodiment, the filtering circuitry 16 may filter the AC power output 20, such as by smoothing the AC waveform, to produce a filtered AC waveform 22. The filtered AC waveform 22 may then be supplied to the AC power grid 24. While the present embodiment shows the power system 10 as being grid-connected, it should be understood that, in other embodiments, the power system 10 may be directly coupled to an AC load, such as a motor, pump, battery, vehicle, or any other type of AC-driven machinery. Further, though not shown in this simplified representation, some embodiments of the power system 10 may include a transformer coupled intermediate the filtering circuitry 16 and the power grid 24. By way of example, the transformer may be configured to step-up the AC output 22 to a higher voltage level that is compatible with the power grid 24.

The power conversion circuitry 14 may be controlled by a controller 26. The controller 26 may include control logic defining one or more control algorithms for regulating the AC current and/or voltage provided to the AC power grid 24. Based upon the applied control algorithms, the controller 26 may provide the appropriate control signals 28 to the power conversion circuitry 14. In one embodiment, the controller 24 may include control logic configured using a maximum point power tracking (MPPT) control technique. As will be appreciated, MPPT control may substantially maximize the power output from the photovoltaic array(s) 12. The controller 26 may include hardware or software, or some combination thereof.

Figure 2:
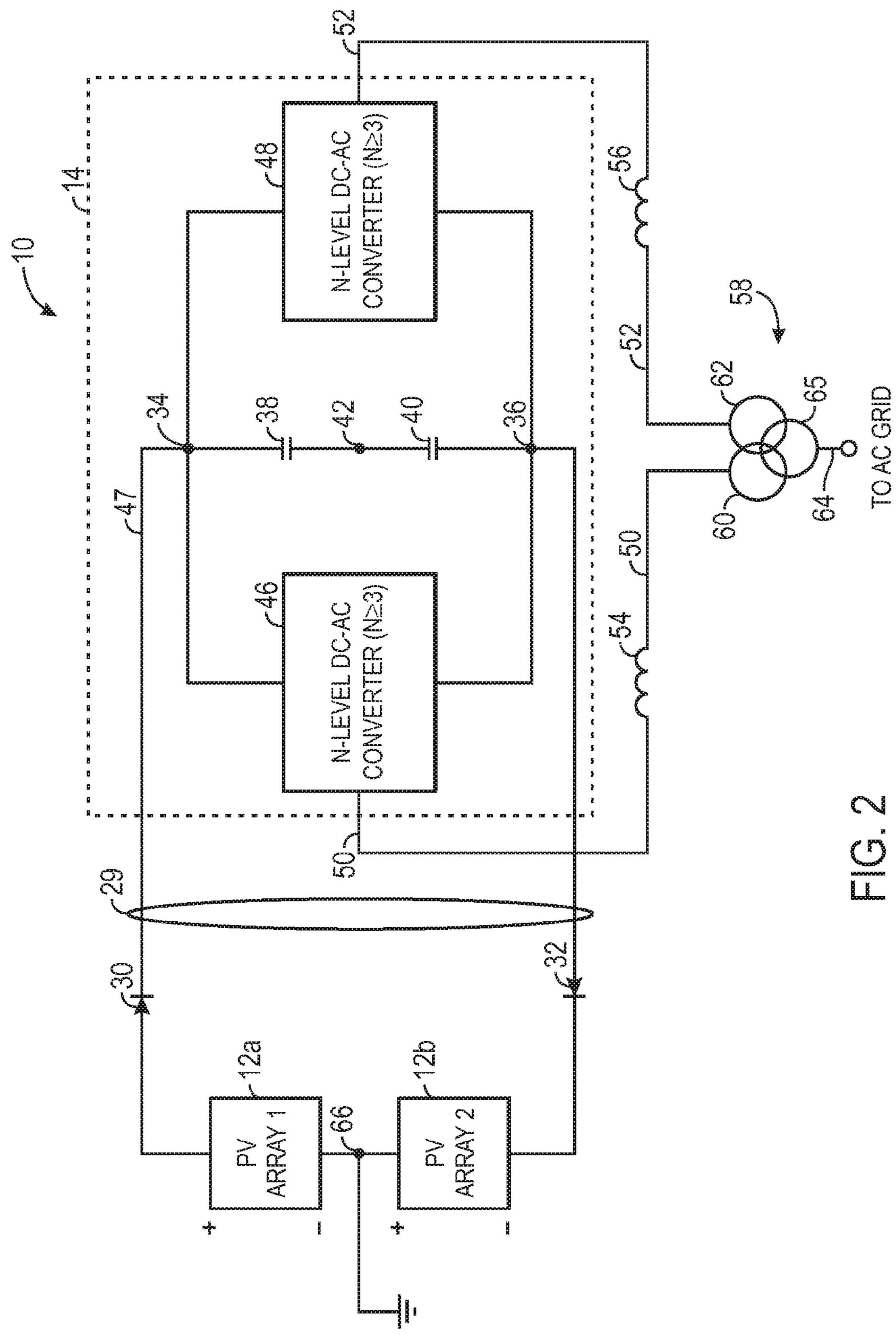
FIG. 2 is a simplified block diagram showing an embodiment of a photovoltaic power system having a plurality of DC-to-AC multilevel converters.

As discussed above, embodiments of the present invention may utilize an arrangement of N-level converters (where N is greater than or equal to 3) to convert the DC power 18 extracted from the photovoltaic array(s) 12 into AC power 20. Referring now to FIG. 2, a simplified circuit diagram showing an embodiment of the photovoltaic power system 10 that includes power conversion circuitry 14 having two N-level converters is illustrated. The power system 10 includes two photovoltaic arrays 12*a* and 12*b* coupled to the power conversion circuitry 14 by way of a DC bus 29 and blocking diodes 30 and 32. For instance, the arrays 12*a* and 12*b* are coupled to nodes 34 and 36, which may define a positive and negative side of the DC bus 29, respectively. The power conversion circuitry 14 may include capacitors 38 and 40 coupled between nodes 34 and 36. In certain embodiments, an intermediate node 42 between capacitors 38 and 40 may provide a neutral reference point for N-level converters 46 and 48, which may be obtained using voltage division of the capacitors 38 and 40. Further, as shown, the N-level converters 46 and 48 are arranged in a parallel manner, such that they are each coupled the common DC bus 29, and share the capacitors 38 and 40, as well as the neutral point 42. In accordance with embodiments of the present invention, the N-level converters 46 and 48 may be contained within a single enclosure or housing.

Figure 3:
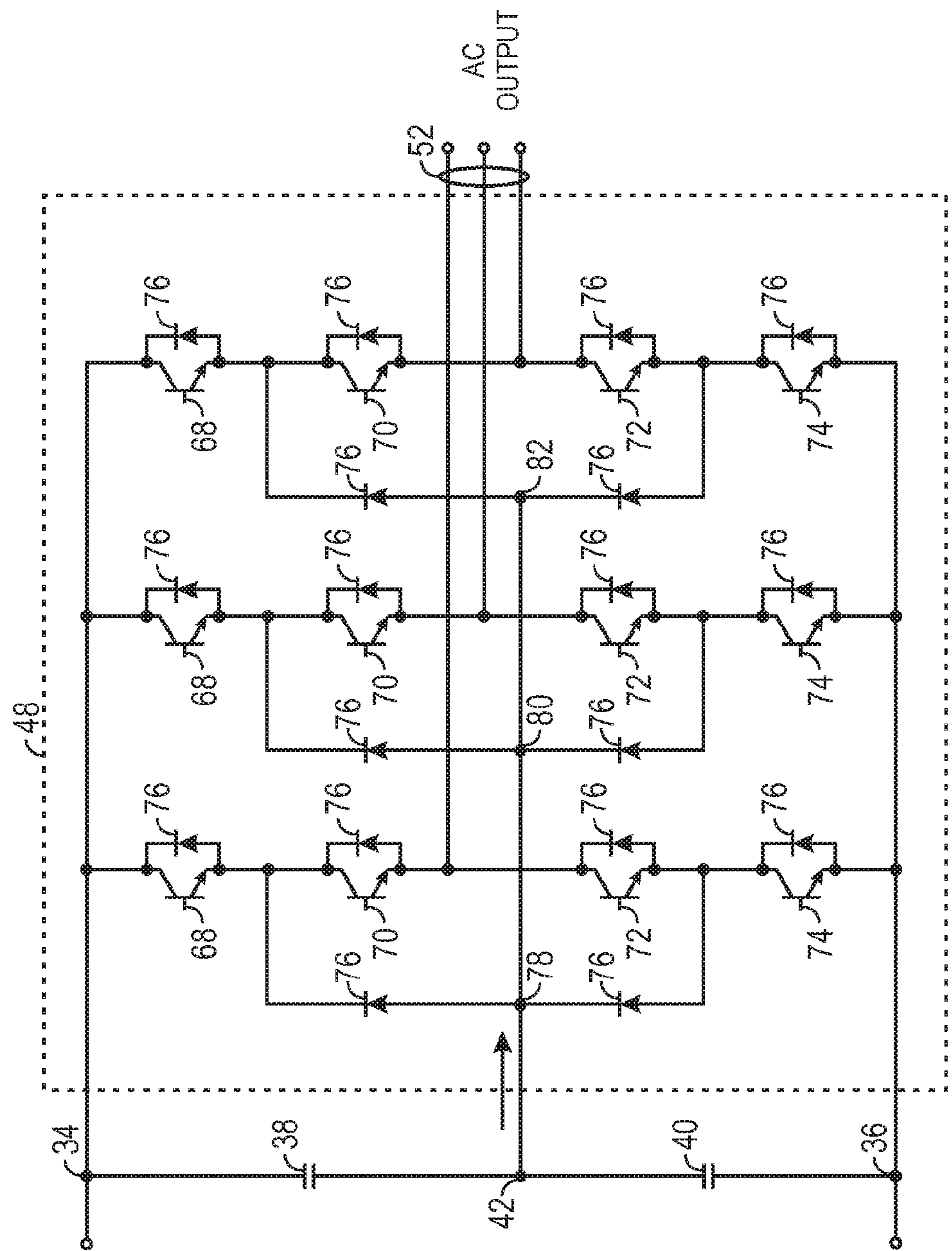
FIG. 3 is a schematic circuit diagram illustrating a neutral-point-clamped three-level converter, in accordance with an embodiment of the present technique.

As discussed above, each of the N-level converters 46 and 48 may be configured to convert a DC signal 47 received via the DC bus 29 into AC power. For instance, the N-level converter 46 may convert the DC signal 47 into the AC power signal 50, and the N-level converter 48 may convert the DC signal 47 into the AC power signal 52. The N-level converters 46 and 48 may be controlled by the control logic 26 (FIG. 1), which may include MPPT control algorithms. The N-level converters 46 and 48 may be provided using a variety of converter topologies, such as diode-clamped (neutral-point-clamped) inverters, flying capacitor converters, single-leg clamped converters, or cascaded converters, to name just a few. An embodiment of a neutral-point-clamped multilevel converter is shown in FIG. 3, and will be described in further detail below. The outputs of the N-level converters 46 and 48 are coupled to inductors 54 and 56, respectively, which may serve as filtering elements for filtering the AC power signals 50 and 52, respectively. Thus, with reference to FIG. 1, the inductors 54 and 56 of the presently illustrated embodiment may collectively provide the filtering circuitry 16.

The outputs of the power conversion circuitry 14 are further coupled to a three-winding transformer 58. The transformer 58 may connect the outputs of the power conversion circuitry 14 to an AC load or to the AC power grid 24. For instance, as shown, the AC output signal 50 of the N-level converter 46 (which may be filtered via inductor 54) is coupled to a first primary winding 60 of the transformer 58, and the AC output signal 52 (which may be filtered via inductor 56) is coupled to a second primary winding 62 of the transformer 58. A secondary winding 64 of the transformer 58 is coupled to the AC power grid 24.

As will be understood, the inversion of a particular DC input voltage may not necessarily produce an AC voltage of corresponding magnitude. By way of example only, the DC-to-AC conversion of a 600 volts DC (VDC) input voltage may produce an AC voltage of approximately 300-400 volts AC (VAC). Thus, where an AC load or an AC power grid 24 requires a higher AC voltage than the output of the power conversion circuitry 14 is capable of providing, the transformer 58 may step up the AC voltage provided by the power conversion circuitry 14 (e.g., received on the primary windings 60 and 62) and output the stepped-up AC voltage 65 via the secondary winding 64, which may then be supplied to the power grid 24. However, the size and cost of transformer circuitry is generally proportional to the amount of stepping required and, therefore, may not always be a practical solution depending on the cost and/or form-factor constraints for a particular power application.

Another solution for increasing the AC voltage output of the converter circuit 14 is to provide higher voltage photovoltaic arrays 12. However, acceptable input voltage ranges for power systems may be limited by certain geographic standards. For instance, the National Electric Code (NEC), which sets certain electrical standards for the United States, specifies that equipment classified as "low-voltage" equipment are not to exceed a voltage differential of 600 VDC with respect to a grounding point. To provide another example, standards in Europe and Asia (IEC standards) may limit the input-to-ground voltage differential for low-voltage equipment to 1000 VDC. Thus, any increase in the DC input voltage may be subject to an upper limit imposed by one or more regional electrical standards.

Referring still to FIG. 2, the illustrated photovoltaic arrays 12*a* and 12*b* may be coupled to a central grounding point 66. In this configuration, the negative side of the photovoltaic array 12*a* and the positive side of the photovoltaic array 12*b* are coupled to the central ground point 66, thus "isolating" each of the photovoltaic arrays 12*a* and 12*b*. This configuration may allow for an increase in the total DC input voltage 47 without exceeding a particular regional standard. By way of example, assuming that an NEC standard limitation of 600 VDC-to-ground applies, each of the photovoltaic arrays 12*a* and 12*b* may be configured to provide a 600 VDC output. Thus, the maximum differential open-load voltage may be as high as 1200 VDC. However, due to the illustrated central grounding arrangement (node 66), the input-to-ground DC voltage with respect to each photovoltaic array 12*a* and 12*b* does not exceed the NEC limit of 600 VDC for low-voltage equipment. In other words, the central grounding configuration shown in FIG. 3 may allow for the input DC voltage to be doubled without exceeding the NEC limit for low-voltage equipment. This allows for the presently illustrated power system configuration to be used flexibly with both low voltage applications (e.g., 600 volts or less under NEC standards) and medium voltage applications (e.g., greater than 600 volts under NEC standards), while remaining within the prescribed low-voltage equipment limits (600 VDC). Similarly, where the IEC limit of 1000 VDC-to-ground applies, each of the photovoltaic arrays 12*a* and 12*b* may be provided as 1000 VDC photovoltaic sources. In such an application, the power system 10 shown in FIG. 2 may provide for a system voltage of up to 2000V while staying within the low voltage equipment classification defined by IEC standards. That is, the power system 10 shown in FIG. 2 may provide for direct connectivity to a medium voltage grid (e.g., greater than 600V) without exceeding the "low voltage equipment" input voltage limitations. Thus, the present N-level power converter configurations offer various improvements, such as in terms of efficiency, cost, grid power quality, and packaging density, when compared to two-level converter designs.

The above-described central grounding arrangement may be used in conjunction with a transformer (e.g., 58) to provide a particular AC voltage level to the power grid 24. In other words, embodiments may include the center grounding point 66 without the transformer 58, the transformer 58 without the center grounding point 66 (and only a single photovoltaic source), or both the transformer 58 and the center grounding point 66 (as shown in FIG. 3). Additionally, it should be noted that the arrangement of the two N-level converters 46 and 48 in the parallel manner illustrated may provide for redundant operation, whereby the power system 10 may continue to operate and deliver AC power to the grid 24 even if one of the N-level converters (46 or 48) fails or malfunctions. Alternatively, the power system of FIG. 2 may include only a single N-level converter, or more than 2 N-level converters.

FIG. 3 shows an embodiment of the N-level converter 48 that may be implemented in the power converter circuitry 14 shown in FIG. 2. The illustrated converter 48 is a three-level neutral-point-clamped (NPC) converter. As shown, the three-level NPC converter 48 includes the capacitors 38 and 40, three-phase AC output terminals 52, switching elements 68, 70, 72, and 74, and diodes 76. The switching elements 68, 70, 72, and 74 may include any suitable type of switching devices, such as insulated-gate bi-polar transistors (IGBT), silicon controlled rectifiers (SCR), or gate turn-off thyristors (GTO), to name just a few.

The illustrated three-level NPC converter 48 is generally configured to provide an AC output waveform using pulse width modulation (PWM) with three voltage levels, which may include a high level, an intermediate level, and a low level. For example, when switching elements 68 and 70 are switched on, the output terminals 52 are connected to the high side of the DC bus 29 (FIG. 2) by node 34, thus providing the high level voltage. When switching elements 70 and 72 are switched on, the output terminals 52 are connected to the neutral point node 42 to provide the intermediate voltage to the output terminals 52. The intermediate voltage may be determined in accordance with principles of voltage division of the capacitors 38 and 40. Similarly, when the switching elements 72 and 74 are switched on, the output terminals 52 are connected to the low side of the DC bus 29 by node 36, thus providing the low level voltage. As will be appreciated, the control logic 26 of the power system 10 may be configured to control the switching pattern applied to the switching elements 68, 70, 72, and 74 in an alternating manner using pulse width modulation to generate the AC output waveform, which may then be supplied to the AC power grid 24. Further, it should be understood that a generally identical circuit may be arranged adjacent to the illustrated three-level converter 48 and the nodes 34 and 36, such that the adjacent circuit shares the capacitors 38 and 40 and the neutral point 42. This adjacent circuit may provide the for the N-level converter 46 (FIG. 2), such that both the N-level converters 46 and 48 are coupled to a common DC bus 29 via the nodes 34 and 36.

Figure 4:
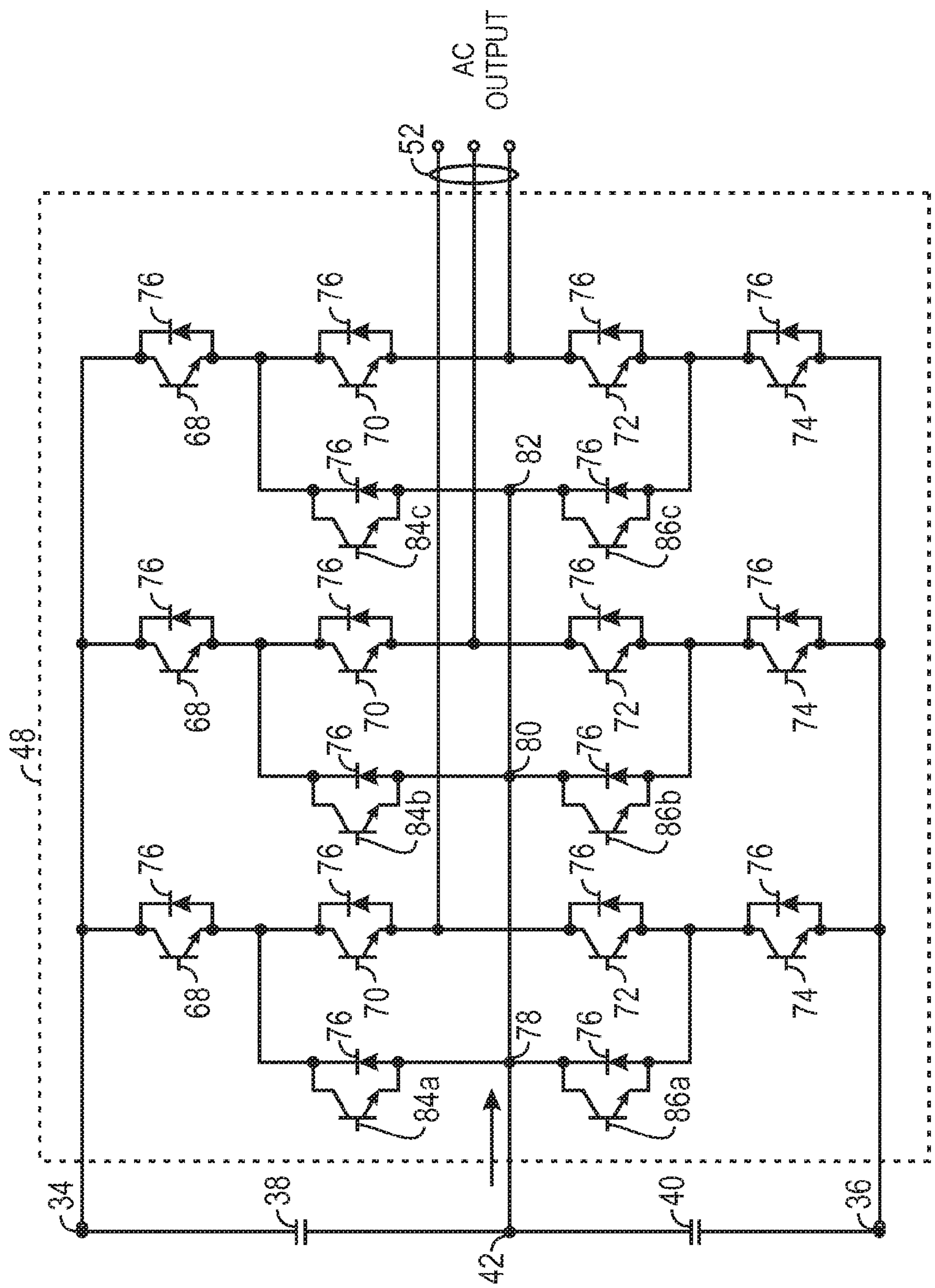
FIG. 4 is a schematic circuit diagram illustrating an active neutral-point-clamped three-level converter, in accordance with an embodiment of the present technique.

Continuing to FIG. 4, another embodiment of the N-level converter 48 that may be implemented in the power converter circuitry 14 shown in FIG. 2 is illustrated. The presently illustrated converter 48 is a three-level active neutral-point-clamped (ANPC) converter. The three-level ANPC converter 48 is similar to the three-level NPC converter shown in FIG. 3 and, thus, identical elements have been numbered with the same reference numbers for clarity. The three-level ANPC converter 48 further includes the switching elements **84*a*-84*c* and 86*a*-86*c*. Again, it should be understood that the switching elements 84*a*-84*c* and 86*a*-86*c* may any suitable type of switching devices (e.g., IGBTs, SCRs, GTOs, etc.), and may be the same type or different type compared to the switching elements 68, 70, 72, and 74**.

Each of the switches **84*a*-84*c* and 86*a*-86*c* may be referred to as "active neutral-point-clamped" switches. Referring briefly back to the embodiment shown in FIG. 3, there is typically a single combination of switch positions for providing each of the high, intermediate, and low voltage levels discussed above. In the presently illustrated APNC converter 48 of FIG. 4, the additional switching elements 84*a*-84*c* and 86*a*-86*c* may be utilized to provide alternate combinations of switching positions for providing the high, intermediate, and low voltage levels. As will be appreciated by those skilled in the art, the use of the active NPC switches 84*a*-84*c* and 86*a*-86*c* may further reduce switching losses in the N-level converter 48 relative to the configuration shown in FIG. 3**.

As discussed above, a three-level converter may have higher partial and full load efficiencies compared to two-level designs. Additionally, the three-level NPC converters shown in FIGS. 3 and 4 may generally provide for improved harmonic performance and reduced semiconductor switching losses (e.g., approximately a 10 to 50 percent reduction) compared to a two-level converter. Further, while FIGS. 3 and 4 are intended to show only some examples of possible multilevel converter topologies that may be included in embodiments of the present invention, other types of converter designs may also be utilized. By way of example only, the multilevel converters 46 and 48 may also include flying capacitor converters, single-leg clamped converters, or cascaded converters. Additionally, while the present embodiment shows a three-level configuration, it should be kept in mind that N-level converters, as defined above, may include configurations of four, five, six, seven, eight, nine, ten or more levels.

Figure 5:
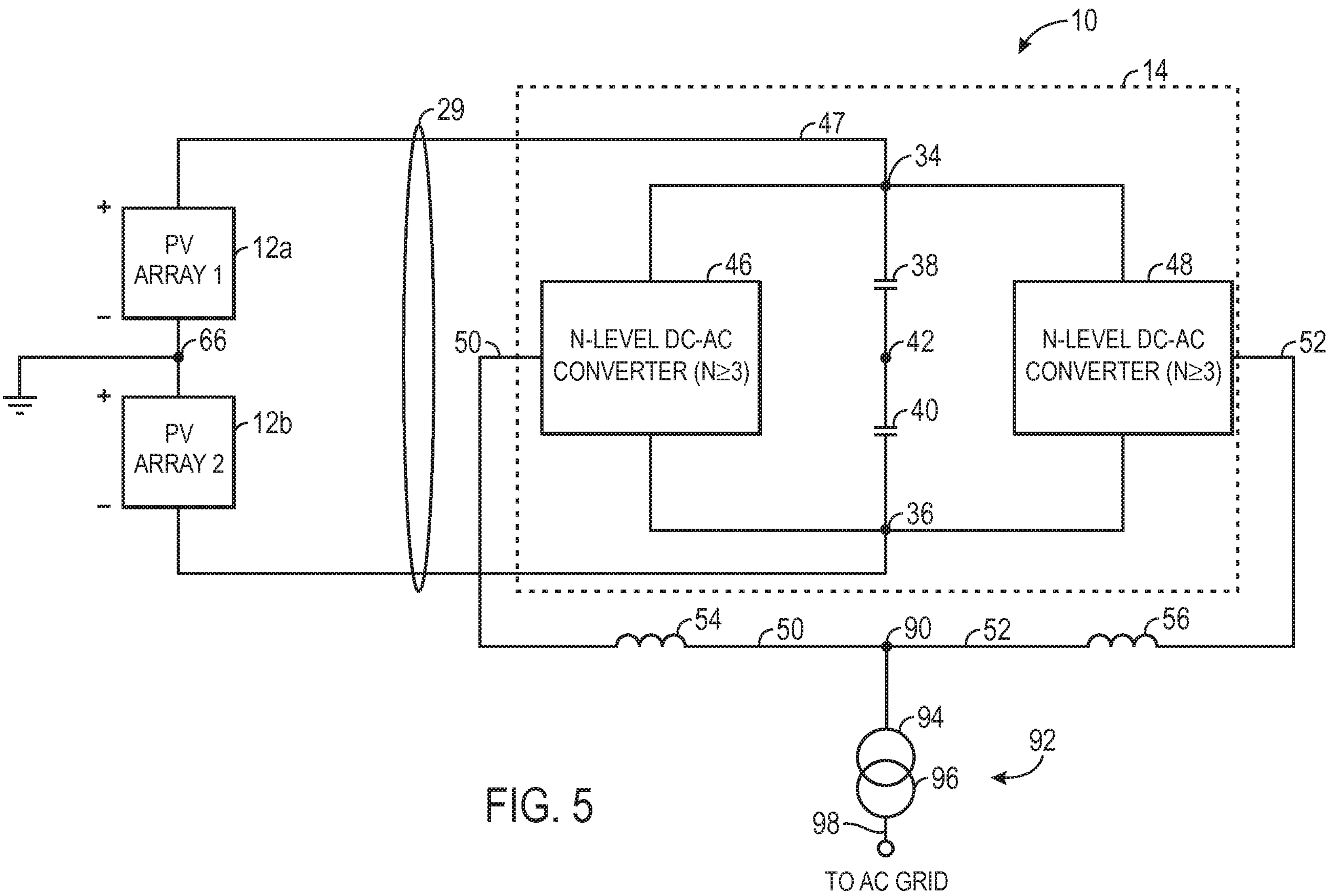
FIG. 5 is a simplified circuit diagram showing a further embodiment of a photovoltaic power system having a plurality of DC-to-AC multilevel converters.

Continuing to FIG. 5, another embodiment of the photovoltaic power system 10 is illustrated by way of a simplified circuit diagram, which includes the N-level converters 46 and 48 coupled to the common DC bus 29. The arrangement of the illustrated power system 10 is generally similar to the embodiment shown in FIG. 2, except that the AC outputs 50 and 52 of the N-level converters 46 and 48, respectively, are coupled to a common node 90. The node 90 is coupled to a first winding 94 of a two-winding transformer 92. The second winding 96 of the transformer 92 may provide a stepped-up AC voltage 98 to the AC power grid 24.

In the present embodiment, the conversion of the DC input voltage 47 (from photovoltaic arrays **12*a* and 12*b*) is controlled by the control logic 26 in such a way that the modulation frequencies of the AC output signals 50 and 52 are phase shifted by 180 degrees with respect to each other. This essentially provides for the interleaving of the AC output signals 50 and 52, which may reduce filtering requirements, and thus lower overall costs. While the present embodiment shows two photovoltaic arrays 12*a* and 12*b* with the center grounding feature discussed above, other embodiments may include only a single photovoltaic array (e.g., with the grounding point on the negative DC rail). Further, like the embodiment of FIG. 2, the parallel arrangement of the two N-level converters 46 and 48 in FIG. 5 provides a redundant design, such that the power system 10 may continue to operate and deliver AC power to the grid 24** even if one of the converters fail.

Figure 6:
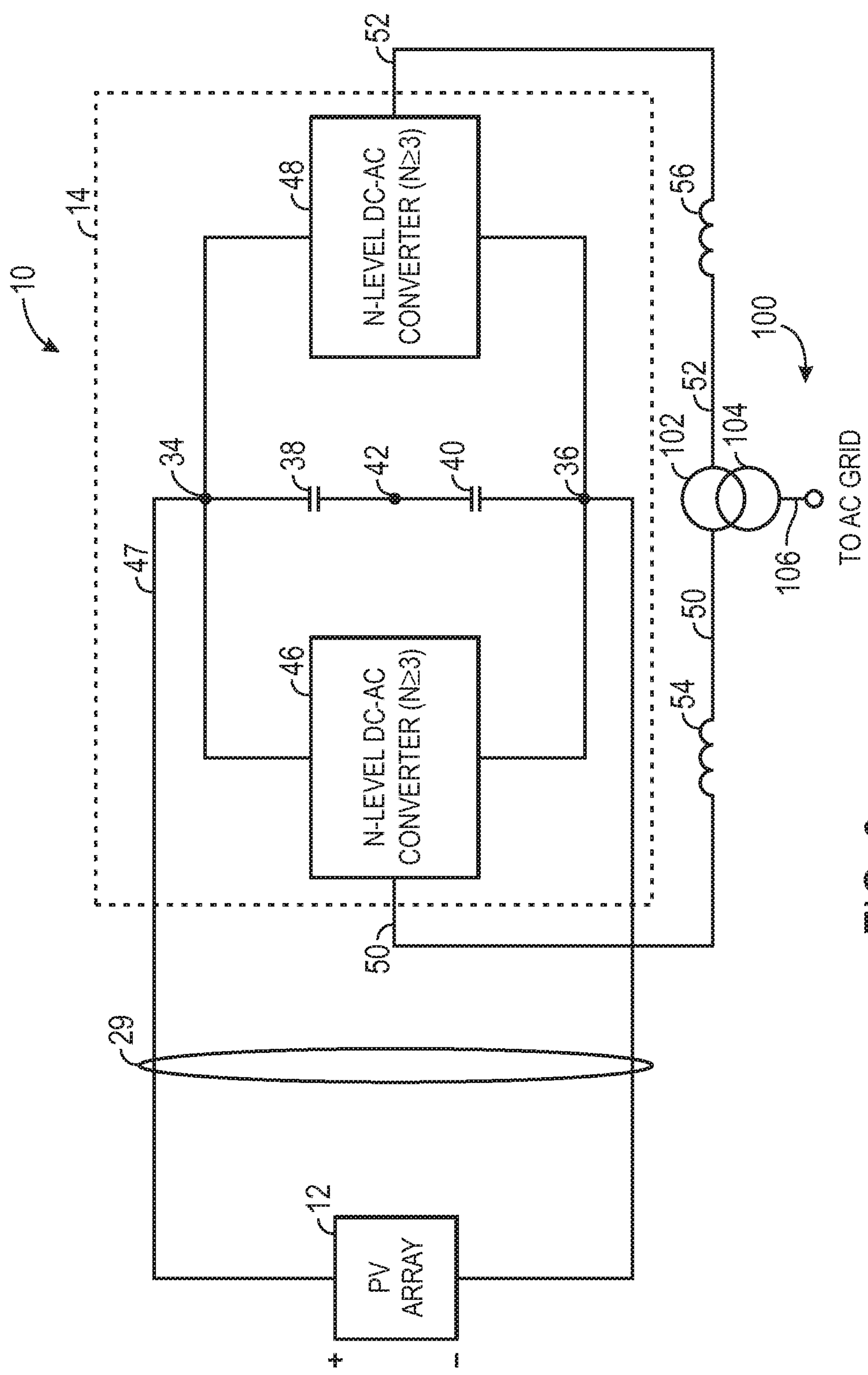
FIG. 6 is a simplified circuit diagram showing another embodiment of a photovoltaic power system having a plurality of DC-to-AC multilevel converters.
Figure 7:
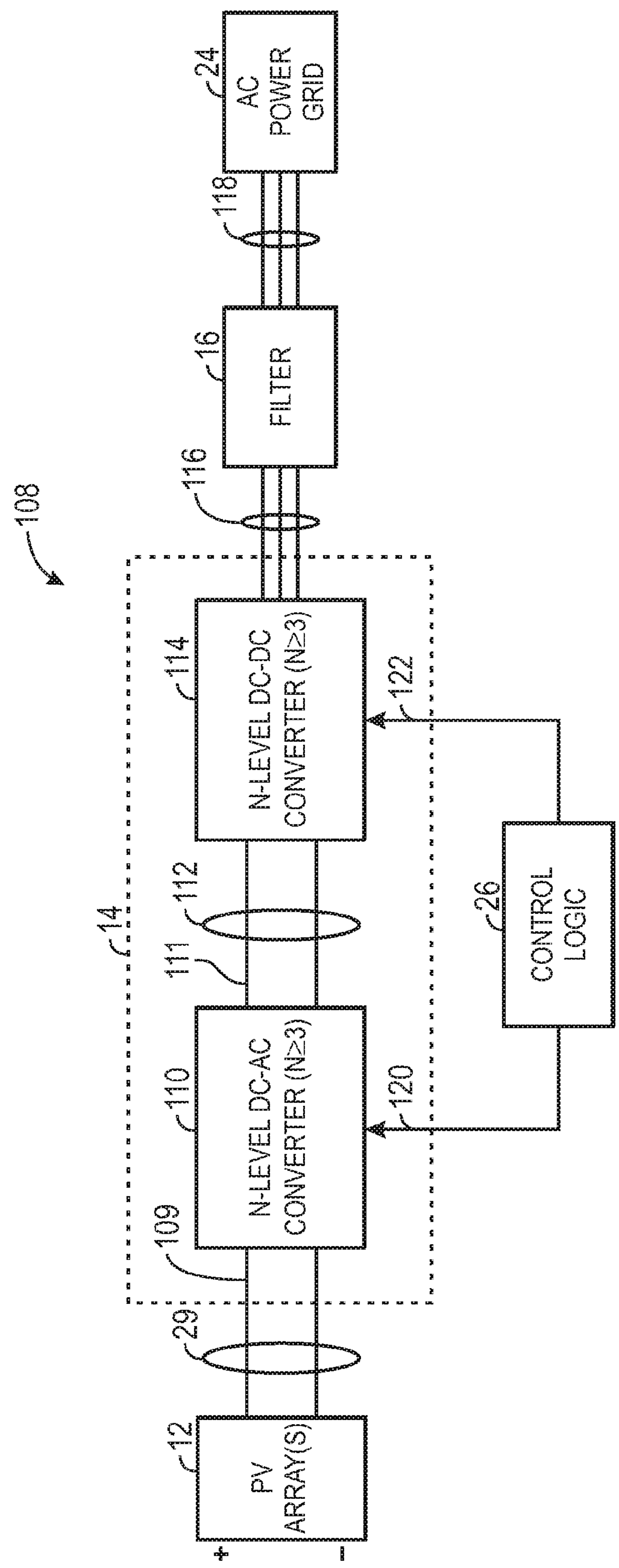
FIG. 7 is a simplified circuit diagram showing an embodiment of a two-stage photovoltaic power system.
Figure 8:
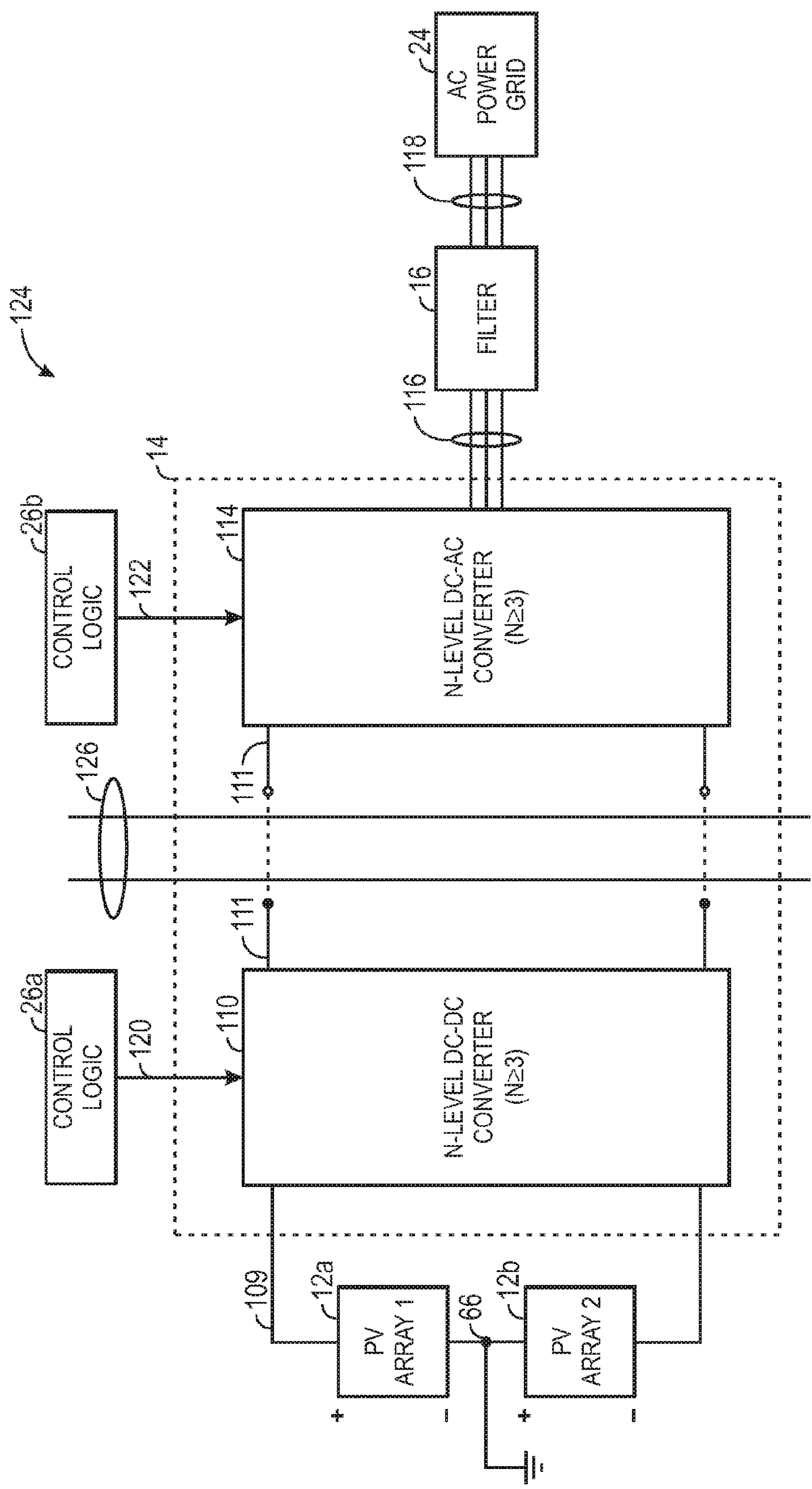
FIG. 8 is a simplified circuit diagram showing another embodiment a two-stage photovoltaic power system that includes distributed power controllers.

FIG. 6 shows a further embodiment of the photovoltaic power system 10. The arrangement of the power system 10 includes circuitry that is generally similar to the embodiment shown in FIG. 5, except that a single photovoltaic array 12 is provided and the AC outputs 50 and 52 of the N-level converters 46 and 48 are coupled to an open winding 102 of a two-winding transformer 100 (e.g., as opposed to being coupled to the common node 90). The second winding 104 of the transformer 100 may provide a stepped-up AC voltage 106 to the AC power grid 24. This arrangement, which may be referred to as a "push-pull" configuration, may help to reduce or eliminate circulating high frequency currents, which may be present in the embodiment shown in FIG. 5, while retaining the benefit of low distortion in the AC output. Further, when compared to the embodiment shown in FIG. 2, the system 10 of FIG. 6 uses only a two-winding transformer, thus eliminating the need for the larger three-winding transformer and, thereby, reducing overall system costs.

The various embodiments described above with reference to FIGS. 2-6 generally depict a single-stage power system with two N-level converters 46 and 48 coupled to a common DC bus 29, and arranged in a parallel manner. In other words, with regard to the embodiments shown in FIGS. 2-6, the DC output (e.g., 47) of the photovoltaic array(s) 12 is converted into AC power via a single stage (e.g., via the two parallel-coupled N-level DC-to-AC converters 46 and 48). It should be understood that, in other embodiments, additional N-level converters may also be provided. For instance, some embodiments may include two, three, four, five or more N-level converters arranged in a parallel manner via a common DC bus 29.

In further embodiments, as will be discussed with reference to FIGS. 7-10, the photovoltaic power system 10 may utilize a multi-stage design, such as a two-stage design or even a three-stage design. For instance, referring to FIG. 7, an embodiment of a two-stage photovoltaic power system 108 is illustrated. In this embodiment, the power conversion circuitry 14 has a first stage that includes a DC-to-DC N-level converter 110, coupled (via DC bus 112) in series to a second stage that includes a DC-to-AC N-level converter 114. In other words, the converters 110 and 114 are coupled to a common DC bus 112, but are coupled in series rather than being in parallel like the embodiments described above in FIGS. 2-6. In the illustrated embodiment, the converters 110 and 114 may be housed within a common enclosure. In the first stage, the DC-to-DC N-level converter 110 receives a DC voltage 109 from the photovoltaic array(s) 12, and may be configured to step-up (or step down) the input DC voltage 109. By way of example, the DC-to-DC N-level converter 110 may step up the input DC voltage 109 by a factor of approximately 2, 3, 4, 5, 6, 7, 8, 9, 10 or more. The stepped-up DC output 111 of the converter 110 is then transmitted via the DC bus 112 to the DC-to-AC N-level converter 114, which may be similar to the N-level converters 46 or 48 discussed above.

The DC-to-AC N-level converter 114 converts the DC voltage 111 received via the bus 112 into an AC signal, which may be three-phase, as shown by the output 116. In other embodiments, the AC output 116 may also be single-phase. The AC output 116 is filtered by the filtering circuitry 16, and the filtered signal 118 may be provided to the AC power grid 24. In some embodiments, the power system 108 may also include a transformer coupled intermediate the filtering circuitry 16 and the power grid 24, wherein the transformer may further step-up the AC output 118 to a voltage level that is compatible with the power grid 24.

The presently illustrated two-stage design may be well-suited for high power applications having a relatively wide input voltage window. As further shown in FIG. 7, the control logic 26 may provide control signals 120 for controlling the DC-to-DC N-level converter 110, and control signals 122 for controlling the DC-to-AC N-level converter 114. As discussed above, the control logic 26 may include MPPT control logic, which may be configured to substantially maximize the power output from the photovoltaic array(s) 12.

In operation, the DC output 109 from the photovoltaic arrays 12*a* and 12*b* is provided as an input to the DC-to-DC converter 110. In the illustrated embodiment, the photovoltaic arrays 12*a* and 12*b* may include the central ground point 66 discussed above. As discussed above, the DC-to-DC converter 110 may step-up the received DC voltage (e.g., by a factor of approximately 2, 3, 4, 5, 6, 7, 8, 9, 10, or more). The stepped-up DC output 111 of the converter 110 is then transmitted on the distributed DC bus 126 to one or more downstream components, which may include the DC-to-AC N-level converter 114. The DC-to-AC N-level converter 114 converts the DC voltage 111 received via the bus 126 into an AC signal 116. The AC output 116 is filtered by the filtering circuitry 16, and the filtered signal 118 may be provided to the AC power grid 24. Again, it should be noted that some embodiments may provide a transformer coupled between the filtering circuitry 16 and the power grid 24, wherein the transformer may further step-up the AC output 118 to a level that is compatible with the power grid 24.

In operation, the DC output 109 from the photovoltaic arrays 12*a* and 12*b* is provided as an input to the DC-to-DC converter 110. In the illustrated embodiment, the photovoltaic arrays 12*a* and 12*b* may include the central ground point 66 discussed above. As discussed above, the DC-to-DC converter 110 may step-up the received DC voltage (e.g., by a factor of approximately 2, 3, 4, 5, 6, 7, 8, 9, 10, or more). The stepped-up DC output 111 of the converter 110 is then transmitted on the distributed DC bus 126 to one or more downstream components, which may include the DC-to-AC N-level converter 114. The AC-to-DC N-level converter 114 converts the DC voltage 111 received via the bus 126 into an AC signal 116. The AC output 116 is filtered by the filtering circuitry 16, and the filtered signal 118 may be provided to the AC power grid 24. Again, it should be noted that some embodiments may provide a transformer coupled between the filtering circuitry 16 and the power grid 24, wherein the transformer may further step-up the AC output 118 to a level that is compatible with the power grid 24.

Due to the distributed configuration of the converters 110 and 114, distributed controllers 26*a* and 26*b* may be provided. For instance, control logic 26*a* may supply the appropriate control signals 120 for controlling the conversion of the DC voltage 109 provided by the photovoltaic arrays 12*a* and 12*b* to a higher DC voltage level 111. The control logic 26*b* may supply the appropriate control signals 122 for controlling the conversion of the DC voltage 111 received via the DC bus 126 into the three-phase AC output signal 116. As discussed above, each of the controllers 26*a* and 26*b* may be configured to implement control in accordance with MPPT control techniques.

Figure 9:
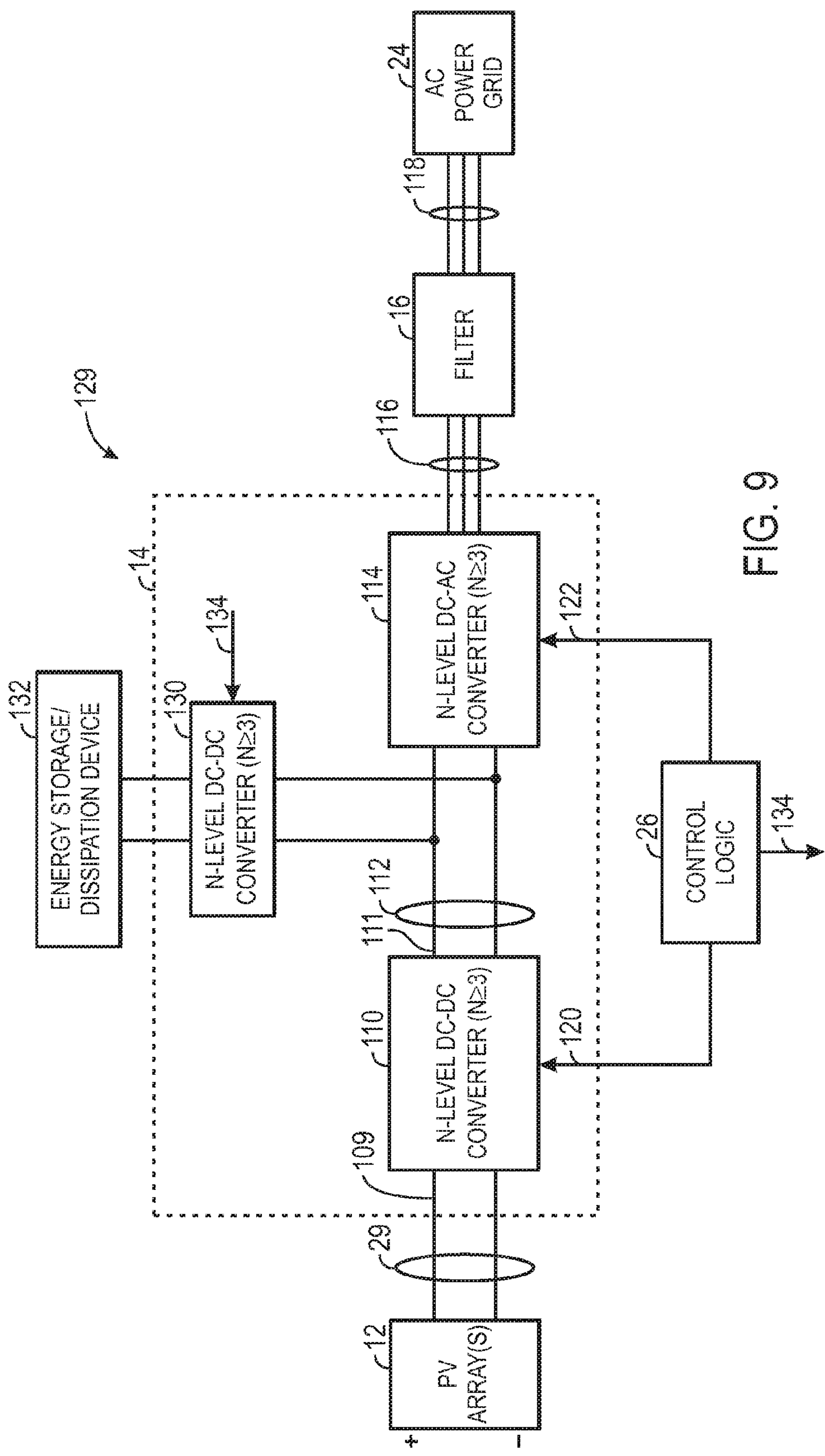
FIGS. 9-10 are simplified circuit diagrams showing embodiments of a three-stage photovoltaic power system.
Figure 10:
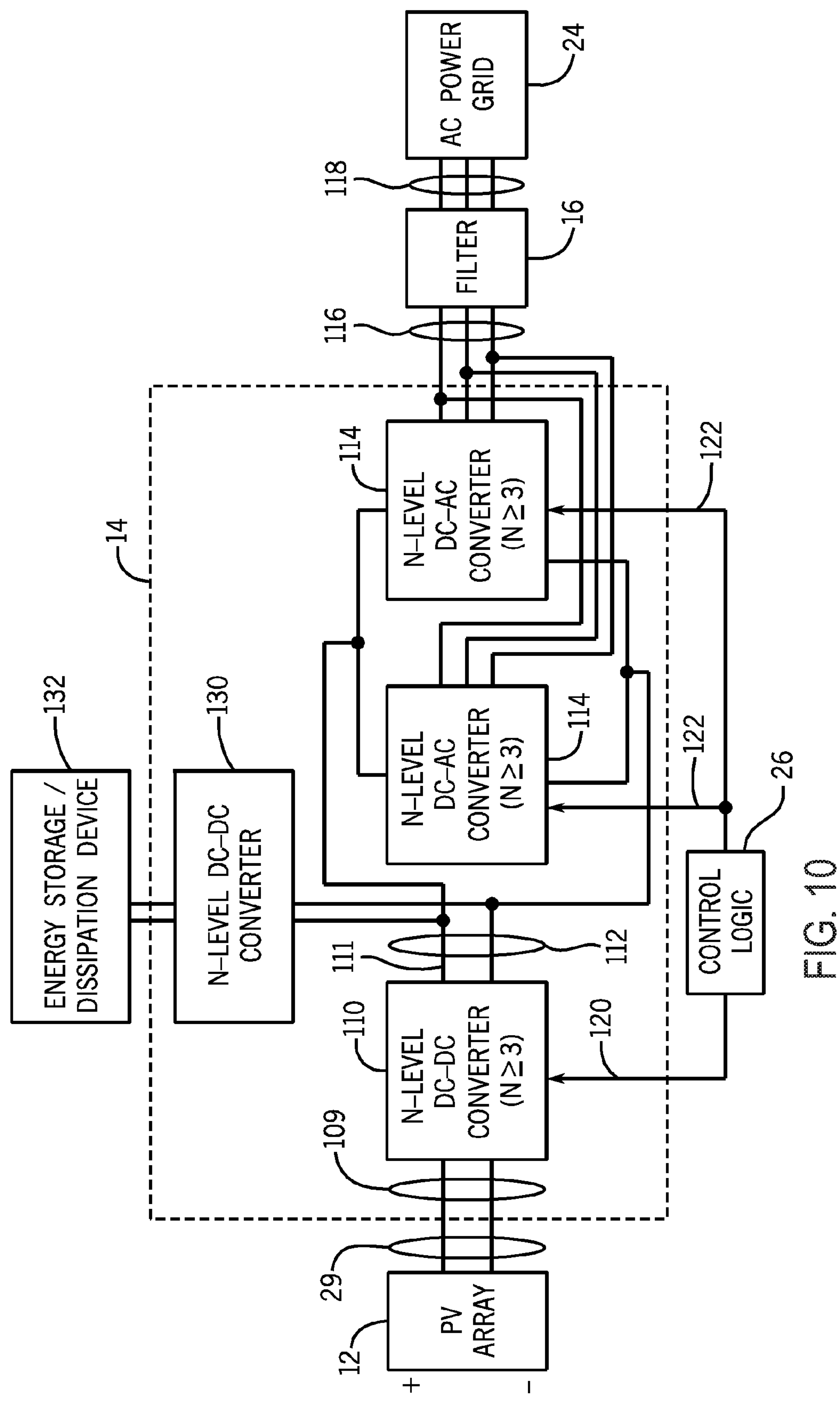

Referring now to FIGS. 9-10 embodiments of a three-stage photovoltaic system 129 are illustrated. The three-stage photovoltaic system 129 includes power conversion circuitry 14 that is similar to the two-stage photovoltaic system 108 shown in FIG. 7, but additionally includes a third stage having DC-to-DC N-level converter 130. As shown, the DC-to-DC N-level converter 130 is coupled to the DC bus 112 and to an energy storage device 132. In one embodiment, the energy storage device 132 may be a battery or fuel cell. In another embodiment, the energy storage device 132 may be replaced with an energy dissipation device, such as a resistor.

The three-stage configuration 129 shown in FIG. 3 may provide for improved power balancing management. For instance, when the power generated by the photovoltaic array(s) 12 is greater than the demand from the AC power grid 24, the excess power may be stored (or dissipated). Similarly, if the demand from the AC power grid 24 exceeds the power output capabilities of the photovoltaic array(s) 12, additional power may be provided by the energy storage device 132 to meet grid demands. Thus, the energy storage device 132 may be configured to store or output power depending on the control of the DC-to-DC N-level converter 130, which may be controlled via control signals 134 from the control logic 26. Further, in some embodiments, the three-stage configuration 129 may provide for grid stabilization, such as by providing for the damping of undesired oscillations in the AC power output.

The implementation of N-level converters (having three or more levels), as described in the above embodiments, may offer several advantages compared to two-level designs. For example, N-level converters generally exhibit increased partial and full load efficiencies, particularly at higher converter switching frequencies. Also, N-level converters generally provide for improved harmonic performance, and reduced semiconductor switching losses, thus reducing cooling requirements. Further, N-level converters can be connected to elevated system voltages exceeding 1,000V without sacrifices in efficiency. Higher system voltages permit the series configuration of a larger number of photovoltaic arrays extracting more power at lower system costs compared to having the same number of photovoltaic arrays connected in parallel. Additionally, the techniques described above may, overall, provide for a standardized power conversion system that may be applied not only to higher voltage photovoltaic systems, but also to other applications, such as wind power systems, fuel cells, battery applications, and ultra-capacitors, to name just a few.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:

a photovoltaic power converter comprising:

one or more photovoltaic arrays configured to convert solar energy into a DC signal; and three or more N-level converters coupled to a common DC bus, wherein N is an integer greater than 2, and wherein the three or more N-level converters comprise:

a first DC-to-DC N-level converter configured to step up the DC signal from a first DC voltage to a second DC voltage;

a second DC-to-DC N-level converter configured to couple to an energy device and the first DC-to-DC N-level converter; and at least one DC-to-AC N-level converter coupled to the first DC-to-DC N-level converter and the second DC-to-DC N-level converter, wherein the at least one DC-to-AC N-level converter is configured to convert the second DC voltage to an AC signal.

2. The system of claim 1, wherein the at least one DC-to-AC N-level converter comprises:

a first DC-to-AC N-level converter; and a second DC-to-AC N-level converter;

wherein the first and second DC-to-AC N-level converters are each configured to receive the second DC voltage and to convert the second DC voltage into the AC signal, and wherein the first DC-to-AC N-level converter is coupled to the second DC-to-AC N-level converter in parallel.

3. The system of claim 2, comprising a control circuitry configured to phase-shift a first AC output of the first DC-to-AC N-level converter by approximately 180 degrees relative to a second AC output of the second DC-to-AC N-level converter.

4. The system of claim 2, wherein a first output of the first DC-to-AC N-level converter and a second output of the second DC-to-AC N-level converter are coupled to a common node.

5. The system of claim 1, wherein the DC-to-AC N-level converter is controlled by a maximum power point tracking (MPPT) algorithm.

6. The system of claim 1, wherein the energy device comprises an energy storage device, an energy dissipation device, or any combination thereof.

7. The system of claim 6, comprising a controller configured to:

send excess energy to the energy storage device via the second DC-to-DC N-level converter when power generated by the photovoltaic arrays exceeds a demand from an AC power grid coupled to the DC-to-AC N-level converter; and send the excess energy to the AC power grid via the second DC-to-DC N-level converter when the power generated the photovoltaic arrays is less than the demand from the AC power grid.

8. The system of claim 1, comprising a controller configured to distribute energy to and from the energy device.

9. The system of claim 1, wherein the at least one DC-to-AC N-level converter is configured to convert the second DC voltage to the AC signal using pulse width modulation with N voltage levels.

10. A system, comprising:

a photovoltaic power converter comprising:

two or more photovoltaic arrays coupled in series and configured to convert solar energy into a DC signal, wherein the two or more photovoltaic arrays comprise a first photovoltaic array comprising a first plurality of photovoltaic cells and a second photovoltaic array comprising a second plurality of photovoltaic cells;

a grounding point coupled between the first and second photovoltaic arrays;

a first DC-to-DC N-level converter configured to step up the DC signal from a first DC voltage to a second DC voltage, wherein the first DC-to-DC N-level converter is coupled downstream from the two or more photovoltaic arrays and wherein N is an integer greater than 2;

a second DC-to-DC N-level converter configured to couple to an energy device and the first DC-to-DC N-level converter; and a DC-to-AC N-level converter coupled to the first DC-to-DC N-level converter and the second DC-to-DC N-level converter, wherein the DC-to-AC N-level converter comprises at least one N-level converter configured to convert the second DC voltage into an AC signal.

11. The system of claim 10, wherein the grounding point is coupled to a negative side of the first photovoltaic array and a positive side of the second photovoltaic array.

12. The system of claim 10, wherein each of the first and second photovoltaic arrays are configured to provide a DC output signal corresponding to a first voltage level.

13. The system of claim 12, wherein a differential open-load voltage of the photovoltaic power converter is twice the first voltage level.

14. The system of claim 10, wherein the DC-to-AC N-level converter comprises a flying capacitor converter, a single-leg clamped converter, or a cascaded converter, or some combination thereof.

15. A system comprising:

a power converter comprising:

at least one DC power source configured to output a DC signal;

a first DC-to-DC N-level converter configured to step up the DC signal from a first DC voltage to a second DC voltage, wherein N is an integer greater than 2;

a second DC-to-DC N-level converter configured to couple to an energy device and the first DC-to-DC N-level converter; and two or more DC-to-AC N-level converters coupled to the first DC-to-DC N-level converter and the second DC-to-DC N-level converter, wherein each of the two or more DC-to-AC N-level converters is configured to convert the second DC voltage to an AC signal; and a three-winding transformer coupled downstream from the two or more DC-to-AC N-level converters.

16. The system of claim 15, wherein the two or more DC-to-AC N-level converters comprise a first N-level converter and a second N-level converter, each being configured to receive the second DC voltage and to convert the second DC voltage into the AC signal, and to output the AC signal via a respective output terminal.

17. The system of claim 16, wherein the three-winding transformer comprises:

a first primary winding coupled to the output terminal of the first N-level converter;

a second primary winding coupled to the output terminal of the second N-level converter; and a secondary winding coupled to a power grid.

18. The system of claim 16, comprising a first capacitive element and a second capacitive coupled in series across the two or more DC-to-AC N-level converters.

19. The system of claim 18, comprising an intermediate node between the first and second capacitive elements, wherein the intermediate node is configured to provide a neutral reference point for the two or more DC-to-AC N-level converters.

20. The system of claim 15, wherein the DC power source comprises a photovoltaic array, a fuel cell, or some combination thereof.

* * * * *